H. O. HEM.
AUTOMATIC WEIGHING SCALE.
APPLICATION FILED OCT. 22, 1915.
1,318,559. Patented Oct. 14, 1919.
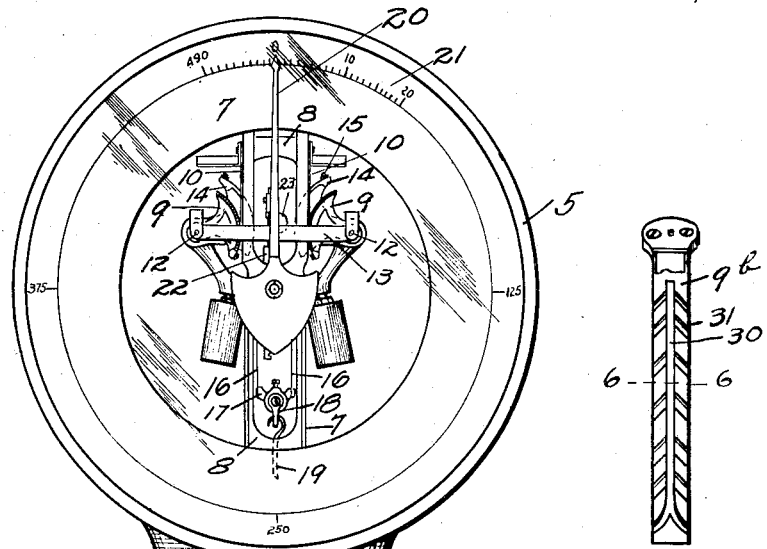
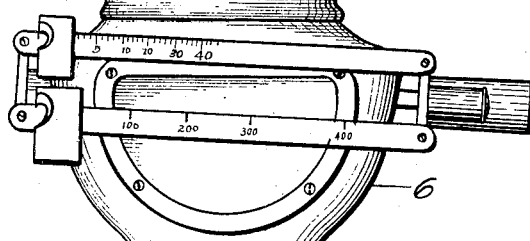
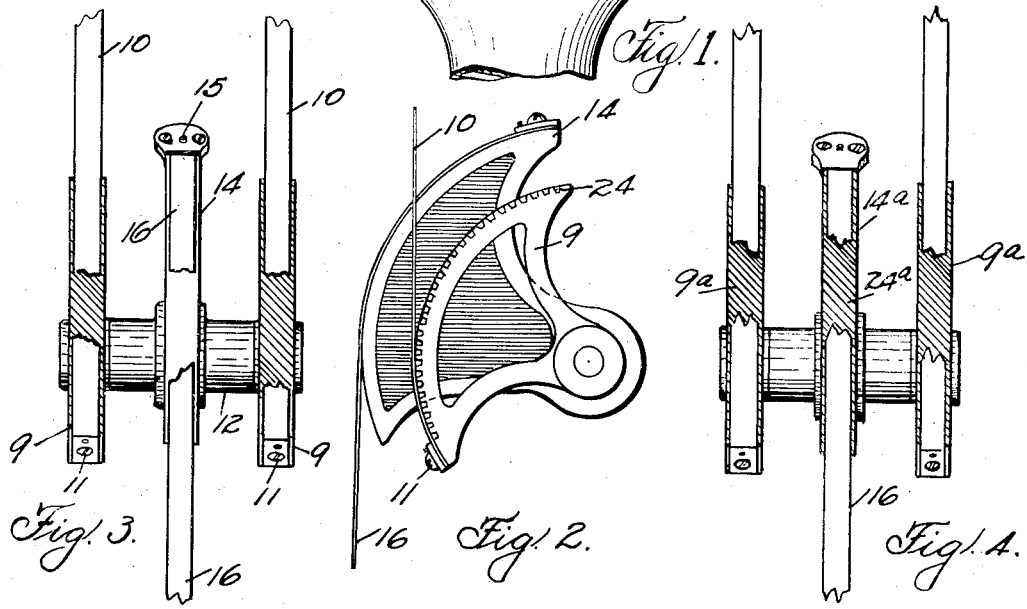
WITNESSES
Carl Zinke
H. G. Newman
INVENTOR
Halvor O. Hem
BY George R. Frye
ATTORNEY

UNITED STATES PATENT OFFICE.

HALVOR O. HEM, OF KANSAS CITY, MISSOURI, ASSIGNOR TO TOLEDO SCALE COMPANY, OF JERSEY CITY, NEW JERSEY, A CORPORATION OF NEW JERSEY.

AUTOMATIC WEIGHING-SCALE.

1,318,559.        Specification of Letters Patent.        Patented Oct. 14, 1919.

Application filed October 22, 1915. Serial No. 57,254.

*To all whom it may concern:*

Be it known that I, HALVOR O. HEM, a citizen of the United States, residing at Kansas City, in the county of Jackson and State of Missouri, have invented new and useful Improvements in Automatic Weighing-Scales, of which the following is a specification.

My invention relates to automatic weighing scales and more particularly to that type of weighing scales known as pendulum scales.

In the development of pendulum scales for general use it has been found that one of the most convenient methods for obtaining accurate weighings is to suspend the pendulum mechanism of the scale upon flexible metallic ribbons, which preferably pass over the arcuate faces of one or more segments attached to the pendulum mechanism; while a similar co-acting ribbon and segment construction has also been employed to aid in transmitting the pull exerted by the load being weighed from the load-receiver to the pendulum. However, a drawback to the universal use of such constructions arises from the fact that it is essential for continued accuracy that the working faces of the segments and ribbons be maintained absolutely free from particles of dust, soot, flour, etc., to which the scale is exposed when employed in certain surroundings. The detrimental effect of particles lodging between the working faces of the ribbon and segment is greatly increased because of the change in leverage resulting, the undesired increase in length of one arm of the pendulum—usually the short arm—being multiplied many times between the point of contact with the particle and the indication afforded by the indicating hand of the scale. In order to overcome this difficulty I propose to so construct the working faces of the segments as to prevent the collection of particles of dust, etc., thereon to the detriment of the accurate operation of the scale and to effect the self-elimination of any particles that may lodge thereon, this construction at the same time assisting in the automatic removal of any particles that may lodge on the working faces of the flexible ribbons.

The primary object of my invention is to improve automatic scales of the pendulum type by increasing and prolonging their accuracy of indication, and diminishing their liability to error.

A further object of my invention is to provide a simple, efficient and inexpensive pendulum mechanism for weighing scales that automatically maintains itself in condition for immediate use, and will render accurate results even when subjected to exposure under difficult working conditions.

With the above and other objects in view, which will readily appear as the invention is better understood, my invention consists in the novel construction, combination and arrangement of parts to be hereinafter more fully described and particularly pointed out in the subjoined claims.

Reference is to be had to the accompanying drawings illustrating preferred embodiments of my invention, and wherein similar reference numerals designate similar parts throughout the several views.

In the drawings:—

Figure 1 is a front elevation of one form of pendulum weighing scales embodying my invention; Fig. 2 is an enlarged detail view in front elevation of a portion of the co-acting segment and ribbon construction; Fig. 3 is a similar view showing the elements in side elevation; Fig. 4 is a view similar to Fig. 3 and showing an alternative construction; Fig. 5 is a face view of a segment embodying another form of my invention; and Fig. 6 is a transverse sectional view taken on the line 6—6 of Fig. 5.

In the drawings, 5 designates a scale housing adapted to inclose the weighing mechanism of the scale and supported upon a suitable column 6, the lower end of which is associated with the base (not shown) of the scale inclosing the platform levers supporting the scale platform (not shown).

The weighing mechanism of the scale herein shown comprises a rectangular frame having four vertical pillars 7 suitably supported from the wall of the scale housing and secured together at the top and bottom by cross-pieces 8. The pillars 7 form guide bearings or tracks for rocker segments 9 which have rolling contact thereon, being supported in position by flexible ribbons 10 of steel or other suitable material fastened to the lower ends of the segments, as at 11, and at their upper ends to the pillars, being thus interposed between the pillars and segments at every position of the latter. The segments 9 are secured upon shafts 12 and the two shafts are connected together by crossbars 13, formed substantially as shown in Fig. 1, the segment shafts and crossbars forming a rectangular frame, by means of which the indicating mechanism of the scale is actuated upon the operation of the pendulum mechanism. The segments 9 are four in number in the modification herein shown, there being a pair upon each side of the rectangular frame, the hub members of each pair being secured adjacent the ends of a common shaft 12.

Intermediate the members of each pair of supporting segments 9 is a somewhat larger segment 14 which is also fixed to the shaft 12, said segment extending at its periphery between the pillars upon the same side of the rectangular frame and connected at its upper end, as at 15, to a flexible ribbon 16 which extends over the arcuate face of the segment and is attached at its lower end to an equalizer bar 17. The construction on both sides of the weighing mechanism is substantially the same, and the ribbons 16 being attached to opposite sides of the equalizer bar 17 which is pivotally connected to a link 18, (see Fig. 1), if the scale be slightly tilted in the plane of the face of the dial and both pendulums thereby shifted in the same direction it will have no effect upon the position of the link 18, since the amount of ribbon taken up upon one segment will be compensated for by that given up by the other, the equalizer bar tilting slightly to adjust itself to the unequal working lengths of the ribbons. The equalizer bar is suitably connected through the link 18 and the hook-rod 19 to the intermediate lever mechanism and the platform levers (not shown) supporting the scale platform. It is to be understood that any suitable platform and platform lever mechanism may be employed in connection with the weighing mechanism of the scale, the weighing mechanism herein shown being designed to satisfactorily operate when employed in various forms of scales, as for example, in dormant, portable or hanging scales.

An indicator hand 20 is pivoted concentric with the indicator dial 21 and the casing 5 and is revolved from the side bars 13 of the rectangular frame joining the segments by means of a vertically-disposed rack 22 attached by a resilient connecting member 23 to a center bar pivotally mounted in the side bars 13 substantially centrally of the length thereof. The rack 22 is in mesh with a pinion (not shown) mounted on the journal of the indicator hand.

In the embodiment shown in Figs. 1, 2 and 3, the arcuate faces of the supporting segments 9 are formed with parallel grooves 24 extending across the faces at an angle to the sides of the segments. Between each groove is formed a raised portion, the face of which corresponds exactly with the desired curvature of the segment, and these raised portions only are contacted by the working faces of the contiguous ribbons, thereby presenting a plurality of points of contact between the adjacent working faces, which points extend from side to side across the segment faces at angles to the sides of the segments. Also the grooves 24 extending at an angle as shown will receive and carry off the dust particles, etc., that would lodge upon the face of the segment, the dust particles being automatically brushed or shaken from the working faces of the segment and ribbon into the grooves during the rolling contacts of these members in the operation of the scale, and fall by gravity down the inclined walls of the grooves, being aided in this falling movement by the rocking of the segments. Thus, the dust particles, etc., that would ordinarily lodge upon the working faces of the segment and ribbon will be automatically removed and eliminated by the segments while performing their ordinary functions in the operation of the scale.

As shown in Figs. 1–3 only the supporting segments 9 are provided with angularly-disposed grooves, and it is believed that continuous accurate operation of the scale can be secured with only these segments grooved, since the working faces of the larger segments 14, connected by the ribbons 16 with the equalizer bar 17, are normally covered by said ribbons throughout a major portion of their lengths, as shown in Fig. 2, while the remaining or uncovered portion of the face of the segment is not used in the normal operation of the scale at the adjustment shown, so that there is little likelihood of dust particles, etc. detrimentally affecting the accurate operation of these segments. However, should it be found desirable, this larger segment may be provided with grooves similar to the grooves 24, as shown in the construction illustrated in Fig. 4 of the drawings. In this figure is shown similar supporting segments 9ᵃ provided with angularly-disposed grooves, and an intermediate larger segment 14ᵃ provided with angular grooves 24ᵃ and raised portions against which the ribbon 16ᵃ contacts in the operation of the pendulum mechanism.

The grooves in the segments shown in the illustrated embodiments of the invention are arranged substantially at an angle of 45° to the sides of the segments, this angularity having been found desirable for general use, though it is to be understood that my invention is not limited to grooves disposed at any particular angle, but is capable of use with grooves at various dispositions.

In Figs. 5 and 6 is shown a segment 9ᵇ, the arcuate face of which is formed with a central longitudinal slot 30 extending from a point adjacent the top of the segment to a point adjacent the lower extremity thereof, being preferably divided at its lower extremity into similar inclined grooves leading to the side edges of the segment. A series of spaced inclined grooves 31 extend from the central slot 30 to the side edges of the segment and provide passages for dust particles, etc. as in the other embodiments of my invention hereinbefore described.

The bearing surfaces of the segments 9, 9ᵃ and 9ᵇ are preferably formed as true arcs of circles, and the bearing surfaces of the segments 14 and 14ᵃ may also be so formed, but in that event the rotary travel or angular displacement of the indicator hand on the chart would not correspond increment for increment with the addition of load to the scale platform, for the reason that it has been found that the turning movement or torque of the segments increases more rapidly at some portions of their paths than at others. Therefore, if the bearing surfaces of all the segments were true arcs of circles, the distances between the weight indications on the chart must necessarily be varied. However, I may employ a segment in which the bearing surface is not formed as the true arc of a circle in order to correct for this variation and enable the employment of a chart having accurately spaced weight indications, or I may construct the segments 9 and 9ᵃ with bearing surfaces of true arcs of circles and vary the bearing surface of the segments 14 and 14ᵃ, making it eccentric with respect to the segments. Also any or all of the segments may be made angularly-adjustable with relation to the shafts 12 and the other segments as desired.

In the operation of the scale, when a pull is exerted upon the equalizer bar 17, as when a load is placed upon the scale platform, this pull is transmitted through the ribbons 16 to the larger segment 14, thereby raising the pendulums to offset the weight of the load, the supporting segments 9 advancing upwardly along the ribbons 10 secured upon the pillars 7, and the pendulum shafts 12 being correspondingly elevated as the segments advance, the elevation of the pendulum shafts carrying the side bars 13 upwardly. The upward movement of the side bars 13 elevates the rack 22 connected therewith, the movement of the rack rotating the pinion meshing therewith and the indicator hand 20 through an appropriate arc to indicate on the graduated dial 21 the weight of the load on the platform. When the load is removed from the scale platform, the falling of the pendulums to their original positions will cause the return of the side bars 13 and the parts associated therewith to their original positions.

While it will be apparent that the illustrated embodiments of my invention herein shown are well calculated to adequately fulfil the objects of the invention primarily stated, it will be understood that the constructions shown are susceptible to modification without departing from the spirit and scope of the invention as set forth in the following claims.

Having described my invention, I claim:

1. In a weighing scale, weighing mechanism comprising a pendulum, a segment associated with the pendulum, and a flexible ribbon co-acting with said segment in the operation of the scale, the bearing face of one of these co-acting members being provided with angularly-disposed parallel grooves to prevent the accumulation of particles between the ribbon and segment.

2. In a weighing scale, weighing mechanism comprising a pendulum, a segment associated with the pendulum, and a flexible ribbon co-acting with said segment in the operation of the scale, the bearing face of the segment being provided with parallel grooves disposed at an angle to the sides of the segment to prevent the accumulation of particles between the ribbon and segment.

3. In a weighing scale, weighing mechanism comprising a pendulum, a segment associated with the pendulum, and a flexible ribbon co-acting with said segment in the operation of the scale, the bearing face of the segment being provided with grooves disposed at an angle to the sides of the segment to prevent the accumulation of particles between the ribbon and segment.

4. In a weighing scale, a pair of oppositely-disposed pendulums each comprising a pair of supporting segments, flexible ribbons secured to the lower ends of said segments and co-acting with said segments in the operation of the scale, an intermediate segment between each pair of supporting segments, flexible ribbons connected to the upper ends of said segments and co-acting with said segments in the operation of the scale, an equalizer bar connecting the lower ends of the last-mentioned ribbons, the arcuate faces of said segments being provided with angularly-disposed grooves.

5. In a weighing scale, a pair of oppositely-disposed pendulums each comprising a pair of supporting segments, flexible ribbons secured to the lower ends of said segments and co-acting with said segments in the operation of the scale, an intermediate segment between each pair of supporting segments, flexible ribbons connected to the upper ends of said segments and co-acting with said segments in the operation of the scale, an equalizer bar connecting the lower ends of the last-mentioned ribbons, the arcuate faces of said segments being provided with parallel grooves disposed at an angle to the sides of said segments.

6. In a weighing scale, weighing mechanism comprising a pendulum, a segment associated with the pendulum, and a flexible ribbon co-acting with said segment in the operation of the scale, the bearing face of the segment being provided with a central groove arranged longitudinally thereof and angularly-disposed lateral grooves leading from said central groove to the sides of the segment.

HALVOR O. HEM.

Witnesses:
 RUSSELL J. BODMAN,
 GEORGE R. FRYE.